United States Patent
Wu

(10) Patent No.: US 11,172,178 B2
(45) Date of Patent: Nov. 9, 2021

(54) PROJECTION SYSTEM AND IMAGE COLOR CORRECTION METHOD

(71) Applicant: Coretronic Corporation, Hsin-Chu (TW)

(72) Inventor: Huai-En Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/741,764

(22) Filed: Jan. 14, 2020

(65) Prior Publication Data

US 2020/0244934 A1   Jul. 30, 2020

(30) Foreign Application Priority Data

Jan. 30, 2019   (CN) .......................... 201910091608.2

(51) Int. Cl.
*H04N 9/31* (2006.01)
*G09G 3/20* (2006.01)

(52) U.S. Cl.
CPC ......... *H04N 9/3182* (2013.01); *G09G 3/2003* (2013.01); *G09G 2340/06* (2013.01)

(58) Field of Classification Search
CPC . H04N 9/3182; G09G 3/2003; G09G 2340/06
USPC ....................................................... 348/744
See application file for complete search history.

(56) References Cited

U.S. PATENT DOCUMENTS

| 6,847,374 B2 * | 1/2005 | Matsuda ................... G09G 5/00 345/589 |
| 7,187,343 B2 * | 3/2007 | Pate ...................... H04N 9/3194 345/1.2 |
| 2017/0070711 A1 * | 3/2017 | Grundhofer ......... H04N 9/3182 |

FOREIGN PATENT DOCUMENTS

| CN | 1517780 | 8/2004 |
| CN | 101022564 | 8/2007 |
| CN | 104933706 | 9/2015 |
| CN | 105430364 | 3/2016 |
| TW | 200413818 | 8/2004 |

(Continued)

OTHER PUBLICATIONS

Rafael C. Gonzalez et al., "Digital Image Processing (2nd Edition)," Prentice Hall Press, Mar. 1987, pp. 289-301.

(Continued)

*Primary Examiner* — Brian P Yenke
*Assistant Examiner* — Omer Khalid
(74) *Attorney, Agent, or Firm* — JCIPRNET

(57) ABSTRACT

A projection system including a first projection device and a first image capturing device is provided. The first projection device projects a first projection image. The first projection image includes a plurality of different color lights and has color blocks of different brightnesses formed by the plurality of different color lights. The first image capturing device captures the first projection image to generate a first captured image. The first image capturing device includes a first processor. The first processor converts the first captured image into a first converted image according to a first conversion matrix. A color gradation adjustment operation is performed on the first converted image to output an adjustment signal, and the first projection device adjusts the (Continued)

projected first projection image according to the adjustment signal. An image color correction method is also provided.

22 Claims, 6 Drawing Sheets

(56) References Cited

FOREIGN PATENT DOCUMENTS

| | | |
|---|---|---|
| TW | 200625967 | 7/2006 |
| TW | 201215167 | 4/2012 |

OTHER PUBLICATIONS

"Office Action of China Counterpart Application", dated Jun. 24, 2021, pp. 1-12.

* cited by examiner

PROJECTION SYSTEM AND IMAGE COLOR CORRECTION METHOD

CROSS-REFERENCE TO RELATED APPLICATION

This application claims the priority benefit of China application serial no. 201910091608.2, filed on Jan. 30, 2019. The entirety of the above-mentioned patent application is hereby incorporated by reference herein and made a part of this specification.

BACKGROUND

Technical Field

The invention relates to an optical system and an optical correction method, and particularly relates to a projection system and an image color correction method.

Description of Related Art

A main difference between a projector and a television is that a light beam of the projector is first projected onto a wall and then reflected to human eyes. Color changes perceived by the human eyes may be varied along with an ambient light source, a color of a projection wall and a color system of the projector itself. Although a red, green and blue color model may intuitively describe any color that can be seen by human eyes, regarding a human eye perception system, an HSV color model makes it easier for people to understand composition of color: Hue, Saturation and Value. A user control interface of the projector or a TV screen also commonly adopts the HSV color model for the user to perform adjustment and control. People may usually perceive a hue shift or a brightness difference of an image projected by the projector.

The projector basically uses mixtures of three color lights to produce various colors. However, along with aging of optical components in the projector, or because the effect of a color temperature of an ambient light source and a color of the projection wall, the projected colors may be varied. Therefore, a color system of the projector often needs to be corrected. Moreover, when several projectors are spliced together, the color systems of different projectors are inconsistent, so that color synchronization among the projectors is also required in order to make overlapping areas of the projectors to merge perfectly.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a projection system and an image color correction method. The projection system performs correction according to the image color correction method, so as to provide good image quality.

Other objects and advantages of the invention may be further illustrated by the technical features broadly embodied and described as follows.

In order to achieve one or a portion of or all of the objects or other objects, an embodiment of the invention provides a projection system. The projection system includes a first projection device and a first image capturing device. The first projection device is configured to project a first projection image. The first projection image includes a plurality of different color lights and has color blocks of different brightnesses formed by the plurality of different color lights.

The first image capturing device is configured to capture the first projection image to generate a first captured image. The first image capturing device includes a first processor. The first processor converts the first captured image into a first converted image according to a first conversion matrix. A color gradation adjustment operation is performed on the first converted image to output an adjustment signal, and the first projection device adjusts the projected first projection image according to the adjustment signal.

In order to achieve one or a portion of or all of the objects or other objects, another embodiment of the invention provides an image color correction method adapted to a projection system. The image color correction method includes: projecting a first projection image, where the first projection image includes a plurality of different color lights and has color blocks of different brightnesses formed by the plurality of different color lights; capturing the first projection image to generate a first captured image; converting the first captured image into a first converted image according to a first conversion matrix; performing a color gradation adjustment operation on the first converted image to output an adjustment signal; and adjusting the projected first projection image according to the adjustment signal.

Based on the above description, the embodiments of the invention have at least one of following advantages and effects. The projection system performs the color gradation adjustment operation on the first converted image to output the adjustment signal, and the first projection device adjusts the projected first projection image according to the adjustment signal, so that the first projection device is adapted to provide good image quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
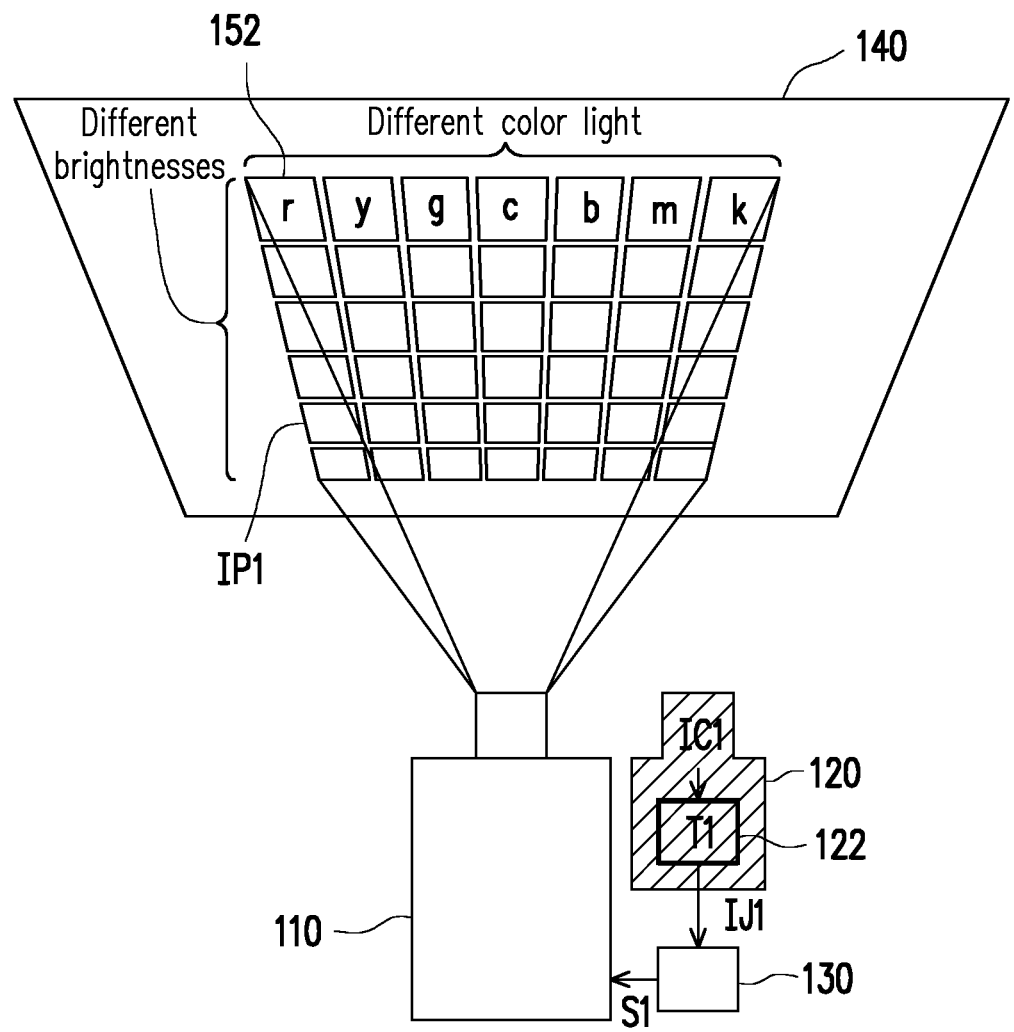
FIG. 1 is a schematic diagram of a projection system according to an embodiment of the invention.

FIG. 1 is a schematic diagram of a projection system according to an embodiment of the invention. Referring to FIG. 1, the projection system 100 of the embodiment includes a first projection device 110 and a first image capturing device 120 and a system processor 130. The first image capturing device 120 includes a first processor 122. In the embodiment, the system processor 130 may be a processor directly embedded in the first image capturing device 120, or independently configured outside the first image capturing device 120. If the system processor 130 is directly embedded in the first image capturing device 120, the system processor 130 is coupled to the first projection device 110; if the system processor 130 is a processor independently configured outside the first image capturing device 120, the system processor 130 is respectively coupled to the first projection device 110 and the first image capturing device 120. When the system processor 130 is embedded in the first image capturing device 120, the system processor 130 may be a processor the same with or different to the first processor 122. When the system processor 130 is independently configured outside the first image capturing device 120, the system processor 130 is, for example, disposed in a host system. The host system is, for example, a desktop computer, a notebook computer or a mobile device, etc., that has a computation function. In the embodiment, the first image capturing device 120 is unnecessarily to be embedded in the first projection device 110.

The first projection device 110 is configured to project a first projection image IP1 onto a projection plane 140 such as a wall or a screen, etc. The first projection image IP1 comprises a plurality of different color lights. The first projection image IP1 has a checker pattern with a plurality of color blocks 152 formed by the different color lights. Each of the color blocks 152 is formed through projection of a different color light with a different brightness, so that the color blocks 152 have different colors, and the brightness of each color light is different. In the embodiment, the first projection device 110, for example, projects the first projection image IP1 with seven color lights of red, yellow, green, cyan, blue, magenta, white and six brightnesses respectively presented by the seven color lights, so that a number of the color blocks 152 formed by the different color lights in different brightnesses is 42, though the invention is not limited thereto.

The first image capturing device 120 is configured to capture the first projection image IP1 projected to the projection plane 140 to generate a first captured image IC1, and the first captured image IC1 is transmitted to the first processor 122. In the embodiment, an image capturing range of the first image capturing device 120 is, for example, greater than or equal to a projection range of the first projection device 110. The first processor 122 converts the first captured image IC1 into a first converted image IJ1 according to a first conversion matrix T1. In the embodiment, the first conversion matrix T1 is, for example, a conversion matrix generated base on a correction color card K (shown in FIG. 5), and is pre-stored in the first image capturing device 120. However, the invention does not limit a generation mode of the first conversion matrix T1. The first converted image IJ1 is an image close to human eye perception.

The system processor 130 is configured to receive the first converted image IJ1 from the first processor 1122 of the first image capturing device 120, and performs a color gradation adjustment operation on the first converted image IJ1 to output an adjustment signal S1 to the first projection device 110. The first projection device 110 adjusts the projected first projection image P1 according to the adjustment signal S1. In the embodiment, the color gradation adjustment operation includes a hue adjustment operation and a value adjustment operation.

Before the system processor 130 performs the hue adjustment operation and the value adjustment operation, the system processor 130 first converts each color light of the first converted image IJ1 from a RGB color space to an HSV color space. Taking red color light as an example, a following matrix conversion represents that the red color light of the first converted image IJ1 is converted from the RGB color space to the HSV color space:

$$\begin{bmatrix} J_{C1}^R(1,r) & J_{C1}^G(1,r) & J_{C1}^B(1,r) \\ J_{C1}^R(2,r) & J_{C1}^G(2,r) & J_{C1}^B(2,r) \\ \vdots & \vdots & \vdots \\ J_{C1}^R(6,r) & J_{C1}^G(6,r) & J_{C1}^B(6,r) \end{bmatrix} \rightarrow \begin{bmatrix} J_{C1}^H(1,r) & J_{C1}^S(1,r) & J_{C1}^V(1,r) \\ J_{C1}^H(2,r) & J_{C1}^S(2,r) & J_{C1}^V(2,r) \\ \vdots & \vdots & \vdots \\ J_{C1}^H(6,r) & J_{C1}^S(6,r) & J_{C1}^V(6,r) \end{bmatrix}$$

Where, r in each element $J^{X1}_{C1}(i,r)$ in the matrix represents the red color light, i is an integer from 1 to 6, which represents that the six color blocks formed by red color light with different brightnesses, X1 represents each coordinate axis of different color spaces of R, G, B, H, S or V. Matrix conversion representations of other color lights may be deduced by analogy.

Then, the system processor 130 performs the hue adjustment operation on the first converted image IJ in the HSV color space. In the hue adjustment operation, the system processor 130 obtains an average hue of each color light in the first converted image IJ1, and calculates a difference between the average hue of each color light and a respective standard hue. Taking the red color light as an example, the system processor 130 calculates an average hue m(H,r) of 6 brightnesses of the red color light. Regarding the red color light, a correct hue should be 0. If m(H,r)>0, the hue of the red color light subtracts m(H,r). If m(H, r)<0, the hue of the red color light is added with m(H,r). Therefore, the system processor 130 may calculate a hue compensation value of the red color light. Hue compensation values of other color lights may be obtained in the same way.

On the other hand, the system processor 130 performs the value adjustment operation on the first converted image IJ1 in the HSV color space. In the value adjustment operation, the system processor 130 takes the minimum value of each brightness in all color lights of the first converted image IJ1, and calculates a compensation value of each color light of the first converted image IJ1 in such brightness based on the minimum value of this brightness. In the embodiment, the system processor 130 further distinguishes a red component $w^R$, a green component $w^G$ and a blue component $w^B$ from a white color light, and the system processor 130 adjusts the brightnesses of 9 color lights. The following matrix represents the brightnesses of 9 color lights:

$$\begin{bmatrix} J_{C1}^V(1,r) & J_{C1}^V(1,y) & J_{C1}^V(1,g) & J_{C1}^V(1,c) & J_{C1}^V(1,b) & J_{C1}^V(1,m) & J_{C1}^V(1,w^R) & J_{C1}^V(1,w^G) & J_{C1}^V(1,w^B) \\ J_{C1}^V(2,r) & J_{C1}^V(2,y) & J_{C1}^V(2,g) & J_{C1}^V(2,c) & J_{C1}^V(2,b) & J_{C1}^V(2,m) & J_{C1}^V(2,w^R) & J_{C1}^V(2,w^G) & J_{C1}^V(2,w^B) \\ J_{C1}^V(3,r) & J_{C1}^V(3,y) & J_{C1}^V(3,g) & J_{C1}^V(3,c) & J_{C1}^V(3,b) & J_{C1}^V(3,m) & J_{C1}^V(3,w^R) & J_{C1}^V(3,w^G) & J_{C1}^V(3,w^B) \\ J_{C1}^V(4,r) & J_{C1}^V(4,y) & J_{C1}^V(4,g) & J_{C1}^V(4,c) & J_{C1}^V(4,b) & J_{C1}^V(4,m) & J_{C1}^V(4,w^R) & J_{C1}^V(4,w^G) & J_{C1}^V(4,w^B) \\ J_{C1}^V(5,r) & J_{C1}^V(5,y) & J_{C1}^V(5,g) & J_{C1}^V(5,c) & J_{C1}^V(5,b) & J_{C1}^V(5,m) & J_{C1}^V(5,w^R) & J_{C1}^V(5,w^G) & J_{C1}^V(5,w^B) \\ J_{C1}^V(6,r) & J_{C1}^V(6,y) & J_{C1}^V(6,g) & J_{C1}^V(6,c) & J_{C1}^V(6,b) & J_{C1}^V(6,m) & J_{C1}^V(6,w^R) & J_{C1}^V(6,w^G) & J_{C1}^V(6,w^B) \end{bmatrix}$$

Where the elements $J^V_{C1}(i, \ell)$ in the matrix represent brightnesses of all of the color lights, i is an integer from 1 to 6, which represents that each color light has 6 color blocks formed by each color light with different brightnesses, $\ell$ is r, y, g, c, b, m, $w^R$, $w^G$ or $w^B$, which respectively represents 9 color lights of red color light, yellow color light, green color light, cyan color light, blue color light, magenta color light, red component of the white color light, green component of the white color light and blue component of the white color light.

Taking a first brightness (i.e. i=1, a first row in the matrix) as an example, the system processor 130 may obtain the minimum value min $\{J^V_{C1}(1, \ell)\}$ of the first brightness from all of the color lights. In this way, the system processor 130 may obtain the minimum value min$\{J^V_{C1}(i, \ell)\}$ of each brightness, where i is an integer from 1 to 6. Taking the red color light as an example, the system processor 130 may calculate a brightness compensation value of the red color light:

$$\frac{1}{6}\sum_{i=1}^{6} \frac{\min\{J^V_{C1}(i,\ell)\}}{J^V_{C1}(i,r)}.$$

Brightness compensation values of the other color lights may be deduced by analogy.

In the embodiment, the system processor 130 performs the color gradation adjustment operation on the first converted image IJ1 so as to output the adjustment signal S1 to the first projection device 110. The adjustment signal S1 includes a hue compensation value and a brightness compensation value of each color light. The first projection device 110 adjusts the projected first projection image IP1 according to the hue compensation value and the brightness compensation value of the adjustment signal S1. In the embodiment, before the first projection image IP1 is adjusted, the brightness of the first projection image IP1 projected by the first projection device 110 is already the maximum brightness, so that when the first projection device 110 adjusts the projected first projection image IP1 according to the brightness compensation value, first projection device 110 decreases the brightness of each color light to implement the adjustment. In this way, the projection image projected from the first projection device 110 does not vary in image color due to the effects of a color temperature of an ambient light source and a color of a projection wall surface.

In the embodiment, in case that a framework of the first projection device 110 is not changed, the first image capturing device 120 is added to perform color correction on the image projected from the first projection device 110, and the image color correction performed on the first projection device 110 is to adjust hue values and brightness values of different color lights.

Figure 2:
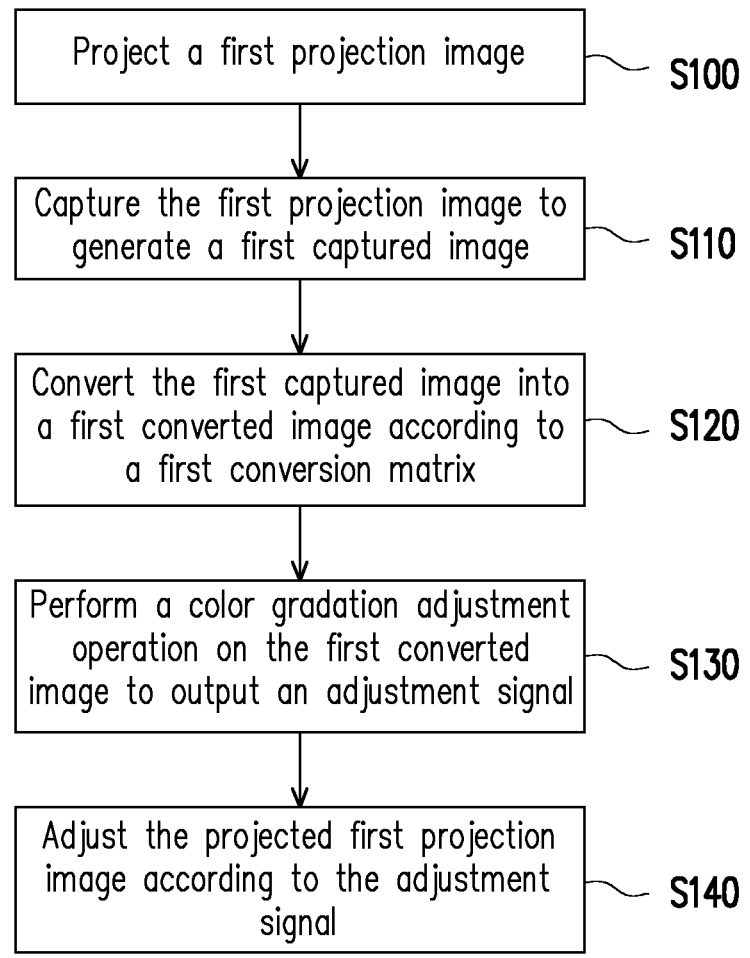
FIG. 2 is a flowchart illustrating an image color correction method according to an embodiment of the invention.

FIG. 2 is a flowchart illustrating an image color correction method according to an embodiment of the invention. Referring to FIG. 1 and FIG. 2, the image color correction method of the embodiment is at least adapted to the projection system 100 of FIG. 1, though the invention is not limited thereto. Taking the projection system 100 of FIG. 1 as an example, in a step S100, the first projection device 110 projects the first projection image IP1. In a step S110, the first image capturing device 120 captures the first projection image IP1 to generate the first captured image IC1. In a step S120, the first processor 122 of the first image capturing device 120 converts the first captured image IC1 into the first converted image IJ1 according to the first conversion matrix T1. In a step S130, the system processor 130 performs a color gradation adjustment operation on the first converted image IJ1 to output the adjustment signal S1. In a step S140, the first projection device 110 adjusts the projected first projection image IP1 according to the adjustment signal S1. Moreover, enough instructions, recommendations and implementation descriptions for the image color correction method of the invention may be learned from the description of the embodiment of FIG. 1, and detail thereof is not repeated.

Figure 3:
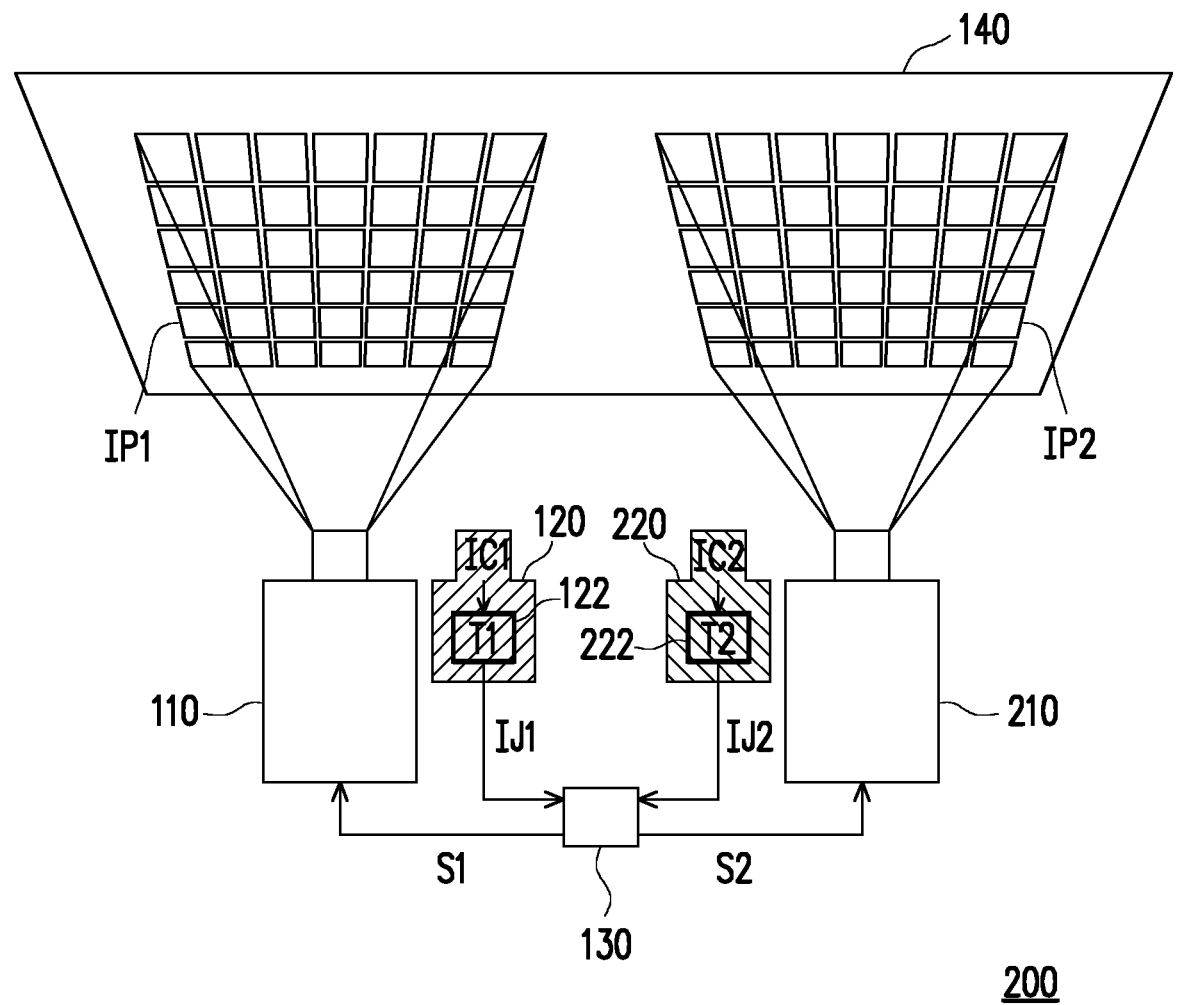
FIG. 3 is a schematic diagram of a projection system according to another embodiment of the invention.

FIG. 3 is a schematic diagram of a projection system according to another embodiment of the invention. Referring to FIG. 1 and FIG. 3, the projection system 200 of the embodiment is similar to the projection system of FIG. 1, and a main difference there between is that the projection system 200 further includes a second projection device 210 and a second image capturing device 220. The second image capturing device 220 includes a second processor 222. In the embodiment, the system processor 130 may be directly embedded in the first image capturing device 120 or the second image capturing device 220, or independently disposed outside the first image capturing device 120 or the second image capturing device 220. When the system processor 130 is disposed in the second image capturing device 220, the system processor 130 may be the same or different to the second processor 222.

In the embodiment, the system processor 130, the first processor 122 and the second processor 222 are processors having computation capability. Alternatively, the system processor 130, the first processor 122 and the second processor 222 may be hardware circuits designed through a Hardware Description Language (HDL) or any other digital circuit design method well known by those skilled in the art, and implemented through a Field Programmable Gate Array (FPGA), a Complex Programmable Logic Device (CPLD) or an Application-specific Integrated Circuit (ASIC).

In the embodiment, the second projection device 210 projects a second projection image IP2 to the projection plane 140. The second image capturing device 220 captures the second projection image IP2. The second processor 222 of the second image capturing device 220 converts a second captured image IC2 into a second converted image IJ2 according to a second conversion matrix T2. The system processor 130 receives the first converted image IJ1 transmitted from the first processor 122 and the second converted image IJ2 transmitted from the second processor 222. The system processor 130 not only performs the color gradation adjustment operation on the first converted image IJ1, but also performs the color gradation adjustment operation on the second converted image IJ2, so as to respectively output the adjustment signal S1 and an adjustment signal S2 to the first projection device 110 and the second projection device 210.

In the embodiment, the method that the system processor 130 performs the hue adjustment operation on the first converted image IJ1 is the same with that of the embodiment of FIG. 1. The method that the system processor 130 performs the hue adjustment operation on the second converted image IJ2 is the similar with that of the embodiment of FIG. 1. In the embodiment, the system processor 130 synchronously performs value adjustment operation on the first converted image IJ1 and the second converted image IJ2.

To be specific, in the value adjustment operation, the system processor 130 obtains the minimum value of each brightness from all color lights of the first converted image IJ1 and the second converted image IJ2, and calculates a compensation value of each color light of the first converted image IJ1 and the second converted image IJ2 in such brightness based on the minimum value of this brightness. Taking a first brightness as an example, the system processor 130 may obtain the minimum value min $\{J^V_{C1}(1, \ell), J^V_{C2}(1, \ell)\}$ from the first brightness in all of the color lights. In this way, the system processor 130 may obtain the minimum value min $\{J^V_{C1}(i, \ell), J^V_{C2}(i, \ell)\}$ of each brightness, where i=1-6. Taking the red color light as an example, the system processor 130 may respectively calculate a brightness compensation value of the red color light of the first projection device 110:

$$\frac{1}{6}\sum_{i=1}^{6} \frac{\min\{J^V_{C1}(i, \ell), J^V_{C2}(i, \ell)\}}{J^V_{C1}(i, r)}$$

and a brightness compensation value of the red color light of the second projection device 210:

$$\frac{1}{6}\sum_{i=1}^{6} \frac{\min\{J^V_{C1}(i, \ell), J^V_{C2}(i, \ell)\}}{J^V_{C1}(i, r)}.$$

Brightness compensation values of the other color lights may be deduced by analogy.

In the embodiment, the system processor 130 performs the color gradation adjustment operation on the first converted image IJ1 so as to output the adjustment signal S1 to the first projection device 110. The adjustment signal S1 includes a hue compensation value and a brightness compensation value of each color light of the first projection device 110. The first projection device 110 adjusts the projected first projection image IP1 according to the hue compensation value and the brightness compensation value of the adjustment signal S1. On the other hand, the system processor 130 performs the color gradation adjustment operation on the second converted image IJ2 so as to output the adjustment signal S2 to the second projection device 120. The adjustment signal S2 includes a hue compensation value and a brightness compensation value of each color light of the second projection device 120. The second projection device 120 adjusts the projected second projection image IP2 according to the hue compensation value and the brightness compensation value of the adjustment signal S2.

In the embodiment, since the system processor 130 may synchronously perform the value adjustment operation on the first converted image IJ1 and the second converted image IJ2, the colors of two or more projection devices may be synchronized, so as to conform the color performances of the projection devices. The image color correction method of the embodiment takes two projection devices as an example, but is not limited to two projection devices. Therefore, the projection system 200 may perform color correction on different projection devices according to different ambient light sources or projection planes, so as to improve the usage rate of the projection devices.

Figure 4:
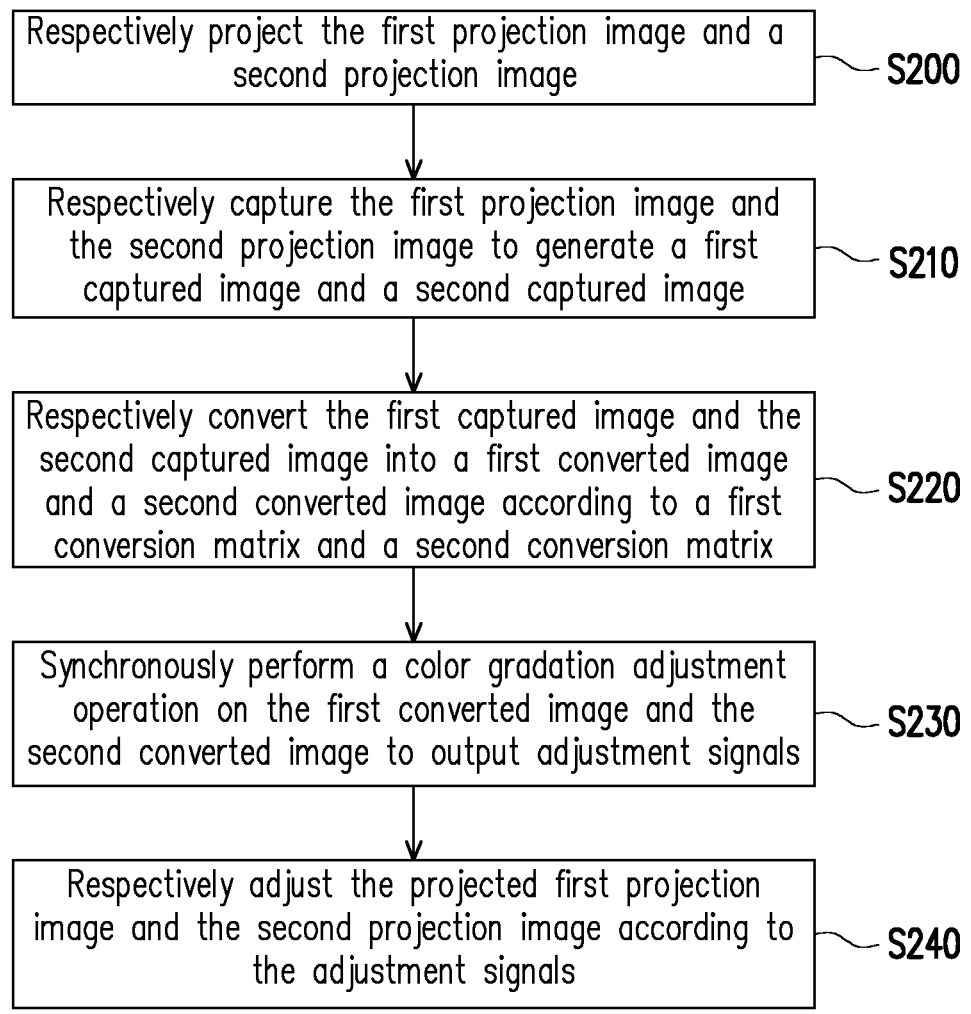
FIG. 4 is a flowchart illustrating an image color correction method according to another embodiment of the invention.

FIG. 4 is a flowchart illustrating an image color correction method according to another embodiment of the invention. Referring to FIG. 3 and FIG. 4, the image color correction method of the embodiment is at least adapted to the projection system 200 of FIG. 3, though the invention is not limited thereto. Taking the projection system 200 of FIG. 3 as an example, in a step S200, the first projection device 110 and the second projection device 210 respectively project the first projection image IP1 and the second projection image IP2. In a step S210, the first image capturing device 120 and the second image capturing device 220 respectively captures the first projection image IP1 and the second projection image IP2 to generate a first captured image IC1 and a second captured image IC2.

In a step S220, the first processor 122 of the first image capturing device 120 and the second processor 222 of the second image capturing device 220 respectively convert the first captured image IC1 and the second captured image IC2 into the first converted image IJ1 and the second converted image IJ2 according to the first conversion matrix T1 and the second conversion matrix T2. In a step S230, the system processor 130 synchronously performs the color gradation adjustment operation on the first converted image IJ1 and the second converted image IJ2 to output the adjustment signal S1 and the adjustment signal S2. In a step S240, the first projection device 110 receives the adjustment signal S1 from the system processor 130, and the second projection device 210 receives the adjustment signal S2 from the system processor 130. The first projection device 110 and the second projection device 210 respectively adjust the projected first projection image IP1 and the second projection image IP2 according to the adjustment signal S1 and the adjustment signal S2. Moreover, enough instructions, recommendations and implementation descriptions for the image color correction method of the invention may be learned from the description of the embodiments of FIG. 1 and FIG. 3, and detail thereof is not repeated.

Figure 5:
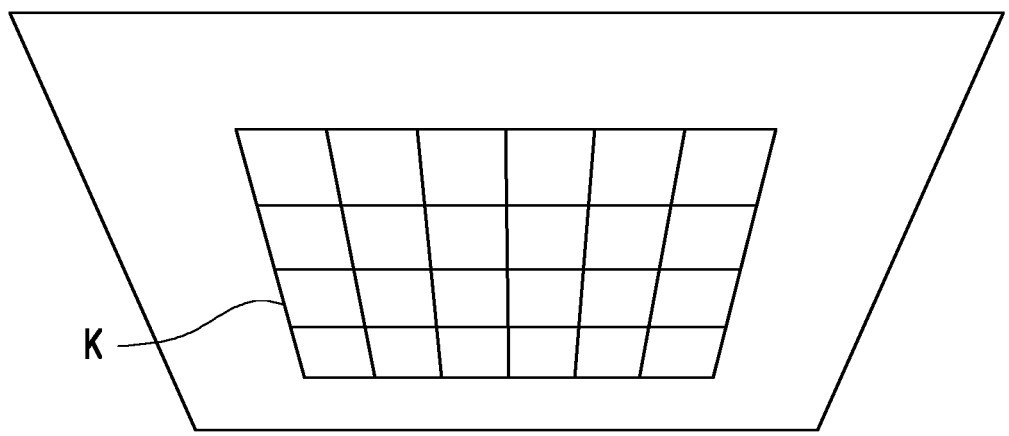
FIG. 5 is a schematic diagram of a projection system according to another embodiment of the invention.
Figure 5:
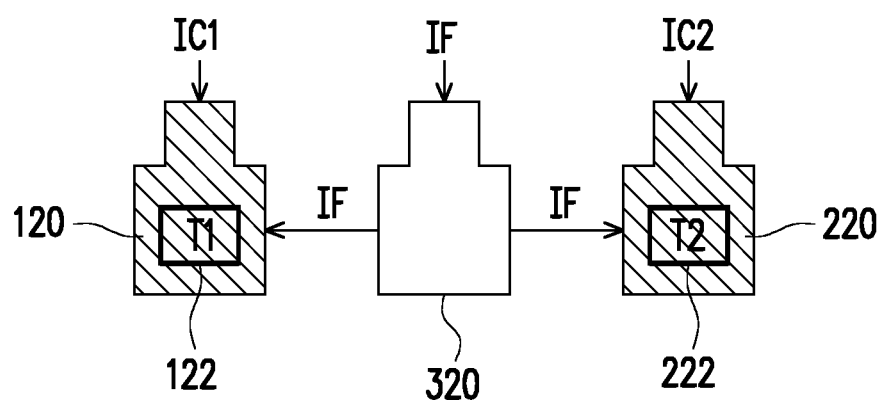

A method of producing the first conversion matrix T1 and the second conversion matrix T2 is described below. FIG. 5 is a schematic diagram of a projection system according to another embodiment of the invention. The projection system 300 of the embodiment includes the first image capturing device 120, the second image capturing device 220 and a third image capturing device 320. The third image capturing device 320 is, for example, a single lens reflex camera, which has been calibrated. The first image capturing device 120 and the second image capturing device 220 are respectively coupled to the third image capturing device 320.

In the embodiment, the ambient light source is set under a standard D65 light source, and a color temperature thereof is 6500K, though the invention is not limited thereto. Under such ambient light source, the third image capturing device 320 captures an image of the correction color card K to generate a reference image IF. The first image capturing device 120 captures the image of the correction color card K to generate a first captured image IC1 to be corrected. The second image capturing device 220 captures the image of the correction color card K to generate a second captured image IC2 to be corrected. In the embodiment, the correction color card K, for example, has 24 color blocks, as shown in FIG. 5. The correction color card K is often used in professional photography, which usually contains 24 printing colors but is not limited to these colors, as long as it covers as many different colors as possible in the gamut.

The method that first processor 122 of the first image capturing device 120 generates the first conversion matrix T1 according to the reference image IF coming from the third image capturing device 320 and the first captured image IC1 to be corrected is, for example, based on a following equation:

$$\begin{bmatrix} I^R_{C1}(1) & I^G_{C1}(1) & I^B_{C1}(1) \\ I^R_{C1}(2) & I^G_{C1}(2) & I^B_{C1}(2) \\ \vdots & \vdots & \vdots \\ I^R_{C1}(24) & I^G_{C1}(24) & I^B_{C1}(24) \end{bmatrix} T1 = \begin{bmatrix} I^R_F(1) & I^G_F(1) & I^B_F(1) \\ I^R_F(2) & I^G_F(2) & I^B_F(2) \\ \vdots & \vdots & \vdots \\ I^R_F(24) & I^G_F(24) & I^B_F(24) \end{bmatrix}$$

Where, $I^R_{C1}(x)$, $I^G_{C1}(x)$, $I^B_{C1}(x)$ represent RGB values of the first captured image IC1 to be corrected corresponding to each color block on the correction color card K. $I^R_F(x)$, $I^B_F(x)$, $I^B_F(x)$ represent RGB values of the reference image IF corresponding to each color block on the correction color card K, and x is an integer from 1 to 24. The method that the second processor 222 of the second image capturing device 220 generates the second conversion matrix T2 according to the reference image IF coming from the third image capturing device and the second image to be corrected IC2 may be deduced by analogy.

In another embodiment, the projection system may only include the first image capturing device 120 and the third image capturing device 320 to generate the first conversion matrix T1. In another embodiment, the projection system may only include the second image capturing device 220 and the third image capturing device 320 to generate the second conversion matrix T2. The method of generating the first conversion matrix T1 and the second conversion matrix T2 is not limited by the invention.

Figure 6:
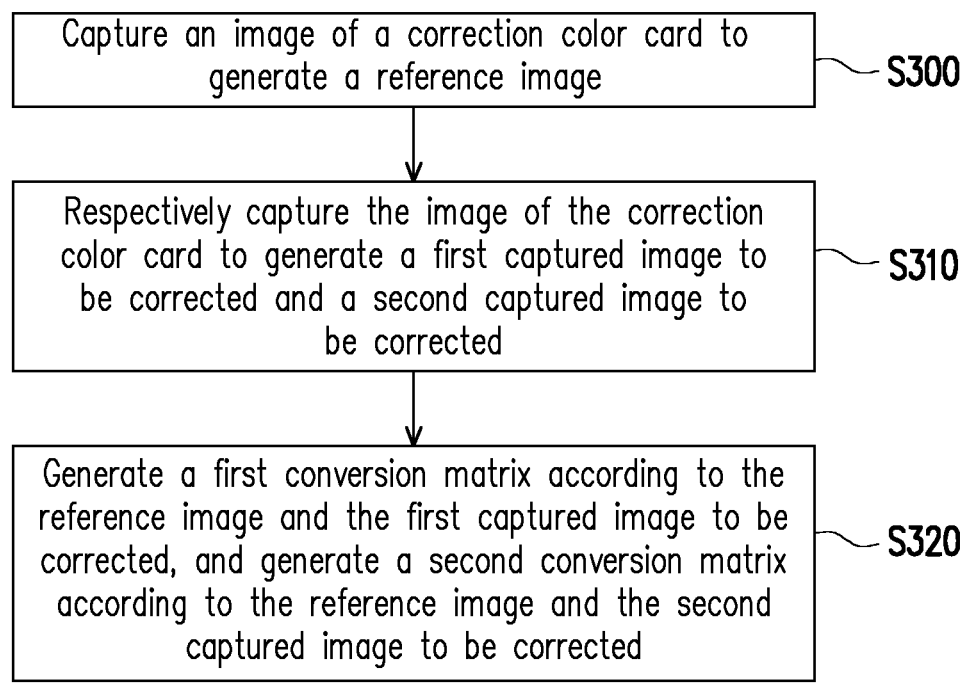
FIG. 6 is a flowchart illustrating a conversion matrix generation method according to an embodiment of the invention.

FIG. 6 is a flowchart illustrating a conversion matrix generation method according to an embodiment of the invention. Referring to FIG. 5 and FIG. 6, the conversion matrix generation method of the embodiment is at least adapted to the projection system 300 of FIG. 5, though the invention is not limited thereto. Taking the projection system 300 of FIG. 5 as an example, in a step S300, the third image capturing device 320 captures an image of the correction color card K to generate the reference image IF. In a step S310, the first image capturing device 120 and the second image capturing device 220 respectively capture the image of the correction color card K to respectively generate the first captured image IC1 to be corrected and the second captured image IC2 to be corrected. In a step S320, the first processor 122 generates the first conversion matrix T1 according to the reference image IF and the first captured image IC1 to be corrected, and the second processor 222 generates the second conversion matrix T2 according to the reference image IF and the second captured image IC2 to be corrected. Moreover, enough instructions, recommendations and implementation descriptions for the image color correction method of the invention may be learned from the description of the embodiment of FIG. 5, and detail thereof is not repeated.

In summary, the embodiments of the invention have at least one of following advantages and effects. Since the system processor may synchronously perform the value adjustment operation on the first converted image and the second converted image, colors of the two or more projection devices may be synchronized. The image color correction method of the invention takes two projection devices as an example, but is not limited to two projection devices. Therefore, the projection system may perform image color correction on different projection devices according to different ambient light sources or projection planes, so as to improve the usage rate of the projection devices. Moreover, image color corrections of two projection devices are performed based on a same image capturing device (for example, a single lens reflex camera), so that image color correction among multiple projection devices may be implemented, which avails stitching of the projection devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising:
   a first projection device, configured to project a first projection image,
   wherein the first projection image comprises a plurality of different color lights and has color blocks of different brightnesses formed by the plurality of different color lights; and
   a first image capturing device, configured to capture the first projection image to generate a first captured image, wherein the first image capturing device comprises a first processor,
   wherein the first processor converts the first captured image into a first converted image according to a first conversion matrix; and
   a second image capturing device, configured to capture an image of a correction color card to generate a reference image, wherein the first image capturing device captures the image of the correction color card to generate a first captured image to be corrected, and the first processor generates the first conversion matrix according to the reference image and the first captured image to be corrected,
   wherein a color gradation adjustment operation is performed on the first converted image to output an adjustment signal, and the first projection device adjusts the projected first projection image according to the adjustment signal.

2. The projection system as claimed in claim 1, further comprising a system processor configured to receive the first converted image to execute the color gradation adjustment operation.

3. The projection system as claimed in claim 2, wherein when the system processor performs the color gradation adjustment operation, the system processor converts each color light of the first converted image from a RGB color space to an HSV color space, and the color gradation adjustment operation comprises a hue adjustment operation and a value adjustment operation.

4. The projection system as claimed in claim 3, wherein when the system processor performs the hue adjustment operation, the system processor takes an average hue of each color light in the first converted image, and calculates a difference between the average hue of each color light and a respective standard hue.

5. The projection system as claimed in claim 4, wherein when the system processor performs the value adjustment operation, the system processor takes the minimum value of each brightness from all color lights of the first converted image, and calculates a compensation value of each color light of the first converted image in such brightness based on the minimum value of this brightness.

6. The projection system as claimed in claim 4, further comprising:
   a second projection device, configured to project a second projection image, wherein the second projection image comprises a plurality of different color lights and has color blocks of different brightnesses formed by the plurality of different color lights; and
   a third image capturing device, configured to capture the second projection image to generate a second captured image, wherein the third image capturing device comprises a second processor,
   wherein the second processor converts the second captured image into a second converted image according to a second conversion matrix;
   wherein the color gradation adjustment operation is performed on the second converted image to output the adjustment signal, and the second projection device adjusts the projected second projection image according to the adjustment signal.

7. The projection system as claimed in claim 6, wherein the system processor receives the second converted image to execute the color gradation adjustment operation.

8. The projection system as claimed in claim 7, wherein when the system processor performs the color gradation adjustment operation, the system processor converts each color light of the second converted image from the RGB color space to the HSV color space.

9. The projection system as claimed in claim 8, wherein when the system processor performs the hue adjustment operation, the system processor takes an average hue of each color light in the second converted image, and calculates a difference between the average hue of each color light and a respective standard hue.

10. The projection system as claimed in claim 9, wherein when the system processor performs the value adjustment operation, the system processor takes the minimum value of each brightness from all color lights of the first converted image and the second converted image, and calculates a compensation value of each color light of the first converted image and the second converted image in such brightness based on the minimum value of this brightness.

11. The projection system as claimed in claim 6, wherein third image capturing device captures the image of the correction color card to generate a second captured image to be corrected, and the second processor generates the second conversion matrix according to the reference image and the second captured image to be corrected.

12. An image color correction method, adapted to a projection system, the image color correction method comprising:
   projecting a first projection image, wherein the first projection image comprises a plurality of different color lights and has color blocks of different brightnesses formed by the plurality of different color lights;
   capturing the first projection image to generate a first captured image;
   capturing an image of a correction color card to generate a reference image;
   capturing the image of the correction color card to generate a first captured image to be corrected;
   generating a first conversion matrix according to the reference image and the first captured image to be corrected;
   converting the first captured image into a first converted image according to the first conversion matrix;
   performing a color gradation adjustment operation on the first converted image to output an adjustment signal; and
   adjusting the projected first projection image according to the adjustment signal.

13. The image color correction method as claimed in claim 12, wherein the step of performing the color gradation adjustment operation comprises: converting each color light of the first converted image from a RGB color space to an HSV color space, wherein the color gradation adjustment operation comprises a hue adjustment operation and a value adjustment operation.

14. The image color correction method as claimed in claim 13, wherein the step of performing the hue adjustment operation comprises: taking an average hue of each color light in the first converted image, and calculating a difference between the average hue of each color light and a respective standard hue.

15. The image color correction method as claimed in claim 14, wherein when the step of performing the value adjustment operation comprises: taking the minimum value of each brightness from all color lights of the first converted image, and calculating a compensation value of each color light of the first converted image in such brightness based on the minimum value of this brightness.

16. The image color correction method as claimed in claim 14, further comprising:
projecting a second projection image, wherein the second projection image comprises a plurality of different color lights and has color blocks of different brightnesses formed by the plurality of different color lights;
capturing the second projection image to generate a second captured image;
converting the second captured image into a second converted image according to a second conversion matrix;
performing the color gradation adjustment operation on the second converted image to output the adjustment signal; and
adjusting the projected second projection image according to the adjustment signal.

17. The image color correction method as claimed in claim 16, wherein the step of performing the color gradation adjustment operation comprises: converting each color light of the second converted image from the RGB color space to the HSV color space.

18. The image color correction method as claimed in claim 17, wherein the step of performing the hue adjustment operation comprises: taking an average hue of each color light in the second converted image, and calculating a difference between the average hue of each color light and a respective standard hue.

19. The image color correction method as claimed in claim 18, wherein the step of performing the value adjustment operation comprises: taking the minimum value of each brightness from all color lights of the first converted image and the second converted image, and calculating a compensation value of each color light of the first converted image and the second converted image in such brightness based on the minimum value of this brightness.

20. The image color correction method as claimed in claim 16, further comprising:
capturing the image of the correction color card to generate a second captured image to be corrected;
generating the second conversion matrix according to the reference image and the second captured image to be corrected.

21. A projection system, comprising:
a first projection device, configured to project a first projection image, wherein the first projection image comprises a plurality of different color lights and has color blocks of different brightnesses formed by the plurality of different color lights; and
a first image capturing device, configured to capture the first projection image to generate a first captured image, wherein the first image capturing device comprises a first processor, and the first processor converts the first captured image into a first converted image according to a first conversion matrix, wherein a color gradation adjustment operation is performed on the first converted image to output an adjustment signal, and the first projection device adjusts the projected first projection image according to the adjustment signal;
a system processor configured to receive the first converted image to execute the color gradation adjustment operation, wherein when the system processor performs the color gradation adjustment operation, the system processor converts each color light of the first converted image from a RGB color space to an HSV color space, and the color gradation adjustment operation comprises a hue adjustment operation and a value adjustment operation, wherein when the system processor performs the hue adjustment operation, the system processor takes an average hue of each color light in the first converted image, and calculates a difference between the average hue of each color light and a respective standard hue;
a second projection device, configured to project a second projection image, wherein the second projection image comprises a plurality of different color lights and has color blocks of different brightnesses formed by the plurality of different color lights; and
a second image capturing device, configured to capture the second projection image to generate a second captured image, wherein the second image capturing device comprises a second processor, and the second processor converts the second captured image into a second converted image according to a second conversion matrix, wherein the color gradation adjustment operation is performed on the second converted image to output the adjustment signal, and the second projection device adjusts the projected second projection image according to the adjustment signal,
wherein the system processor receives the second converted image to execute the color gradation adjustment operation, wherein when the system processor performs the color gradation adjustment operation, the system processor converts each color light of the second converted image from the RGB color space to the HSV color space, wherein when the system processor performs the hue adjustment operation, the system processor takes an average hue of each color light in the second converted image, and calculates a difference between the average hue of each color light and a respective standard hue,
wherein when the system processor performs the value adjustment operation, the system processor takes the minimum value of each brightness from all color lights of the first converted image and the second converted image, and calculates a compensation value of each color light of the first converted image and the second converted image in such brightness based on the minimum value of this brightness.

22. An image color correction method, adapted to a projection system, the image color correction method comprising:
projecting a first projection image, wherein the first projection image comprises a plurality of different color lights and has color blocks of different brightnesses formed by the plurality of different color lights;
capturing the first projection image to generate a first captured image;

converting the first captured image into a first converted image according to a first conversion matrix;

performing a color gradation adjustment operation on the first converted image to output an adjustment signal, wherein the step of performing the color gradation adjustment operation comprises: converting each color light of the first converted image from a RGB color space to an HSV color space, wherein the color gradation adjustment operation comprises a hue adjustment operation and a value adjustment operation, wherein the step of performing the hue adjustment operation comprises: taking an average hue of each color light in the first converted image, and calculating a difference between the average hue of each color light and a respective standard hue; and adjusting the projected first projection image according to the adjustment signal;

projecting a second projection image, wherein the second projection image comprises a plurality of different color lights and has color blocks of different brightnesses formed by the plurality of different color lights;

capturing the second projection image to generate a second captured image;

converting the second captured image into a second converted image according to a second conversion matrix;

performing the color gradation adjustment operation on the second converted image to output the adjustment signal, wherein the step of performing the color gradation adjustment operation comprises: converting each color light of the second converted image from the RGB color space to the HSV color space, wherein the step of performing the hue adjustment operation comprises: taking an average hue of each color light in the second converted image, and calculating a difference between the average hue of each color light and a respective standard hue; and adjusting the projected second projection image according to the adjustment signal, wherein the step of performing the value adjustment operation comprises: taking the minimum value of each brightness from all color lights of the first converted image and the second converted image, and calculating a compensation value of each color light of the first converted image and the second converted image in such brightness based on the minimum value of this brightness.

\* \* \* \* \*